(12) United States Patent
Khera et al.

(10) Patent No.: US 9,885,386 B2
(45) Date of Patent: Feb. 6, 2018

(54) BEARING ASSEMBLY

(71) Applicant: General Electric Company, Schenectady, NY (US)

(72) Inventors: Awtar Singh Khera, West Chester, OH (US); Rene Canul Melendez, Santiago de Queretaro (MX); Cesar Antonio Labastida Ponce, Santiago de Queretaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/739,880

(22) Filed: Jun. 15, 2015

(65) Prior Publication Data

US 2016/0363163 A1 Dec. 15, 2016

(51) Int. Cl.
| | | |
|---|---|---|
| *F16C 23/04* | (2006.01) | |
| *F16C 33/04* | (2006.01) | |
| *F16C 43/02* | (2006.01) | |
| *F16C 35/02* | (2006.01) | |
| *F16C 17/10* | (2006.01) | |
| F16C 35/04 | (2006.01) | |
| F16C 17/02 | (2006.01) | |
| F16C 23/08 | (2006.01) | |

(52) U.S. Cl.
CPC .......... *F16C 23/046* (2013.01); *F16C 17/10* (2013.01); *F16C 23/04* (2013.01); *F16C 33/043* (2013.01); *F16C 35/02* (2013.01); *F16C 43/02* (2013.01); *F16C 17/022* (2013.01); *F16C 23/08* (2013.01); *F16C 35/045* (2013.01); *F16C 35/047* (2013.01); *F16C 2360/23* (2013.01)

(58) Field of Classification Search
CPC .... F16C 23/043; F16C 23/045; F16C 23/046; F16C 33/043; F16C 2223/60; F16C 2226/60; F16C 11/0614; C23C 4/10; C23C 14/0635; F04D 29/0467
USPC ..... 415/124.2, 132, 133, 148, 150, 155, 160
See application file for complete search history.

(56) References Cited

U.S. PATENT DOCUMENTS

| | | | |
|---|---|---|---|
| 2,731,310 A | | 1/1956 | Potter |
| 2,827,340 A | * | 3/1958 | Johnson ................ F16C 23/045 384/209 |
| 2,906,568 A | | 9/1959 | Gray |

(Continued)

FOREIGN PATENT DOCUMENTS

| | | |
|---|---|---|
| DE | 1922801 U | 9/1965 |
| EP | 1895181 A2 | 3/2008 |

(Continued)

OTHER PUBLICATIONS

"Future Add, Service Evaluation" E-mail Correspondence; Date sent Dec. 4, 2014; 4 pages.

(Continued)

*Primary Examiner* — Phillip A Johnson
(74) *Attorney, Agent, or Firm* — Fletcher Yoder P.C.

(57) ABSTRACT

A system includes a bearing assembly configured to be coupled to a compressor of a gas turbine engine and to receive an end of a torque shaft assembly, a bearing housing, and a circumferential bearing. The circumferential bearing includes a split race and a ball disposed within the split race. The circumferential bearing may be configured to be removed from the bearing housing without having to remove the torque shaft assembly from the compressor.

17 Claims, 6 Drawing Sheets

(56) References Cited

U.S. PATENT DOCUMENTS

| | | | |
|---|---|---|---|
| 3,516,136 A * | 6/1970 | Turner | F16C 23/045 |
| | | | 29/441.1 |
| 3,522,976 A * | 8/1970 | Spyra | F16C 23/045 |
| | | | 384/209 |
| 3,631,735 A | 1/1972 | McCarty | |
| 3,685,878 A | 8/1972 | Orkin | |
| 3,689,126 A | 9/1972 | Hayashi et al. | |
| 3,700,298 A | 10/1972 | Hay | |
| 4,183,590 A * | 1/1980 | Lower | F16C 23/045 |
| | | | 29/898.052 |
| 4,355,250 A | 10/1982 | Langdon | |
| 6,092,934 A | 7/2000 | Kettler | |
| 6,551,057 B1 * | 4/2003 | Haaser | F01D 17/162 |
| | | | 415/119 |
| 7,559,698 B2 | 7/2009 | Shore | |
| 7,794,205 B1 | 9/2010 | Lowe-Wylde | |
| 7,815,536 B2 | 10/2010 | Jansen et al. | |
| 7,828,482 B2 | 11/2010 | Beausoleil et al. | |
| 2007/0274618 A1 * | 11/2007 | Sandin | B65G 49/063 |
| | | | 384/212 |
| 2010/0133854 A1 | 6/2010 | Jansen et al. | |
| 2010/0150764 A1 | 6/2010 | Simonelli | |
| 2010/0237621 A1 | 9/2010 | Tessier et al. | |
| 2011/0260456 A1 | 10/2011 | Harris et al. | |
| 2014/0234609 A1 * | 8/2014 | Reisel | C22C 29/08 |
| | | | 428/312.8 |
| 2015/0198204 A1 | 7/2015 | Abrudan et al. | |

FOREIGN PATENT DOCUMENTS

| | | |
|---|---|---|
| EP | 1957810 A1 | 8/2008 |
| FR | 2691220 A1 | 11/1993 |

OTHER PUBLICATIONS

PCT Search Report and Written Opinion issued in connection with corresponding PCT Application No. PCT/US2016/036181 dated Aug. 17, 2016.

"VSV Shaft Failure—Spare Parts List"; Emails dated Sep. 14, 2011, Aug. 30, 2011, and Sep. 15, 2011 (2 pages).

* cited by examiner

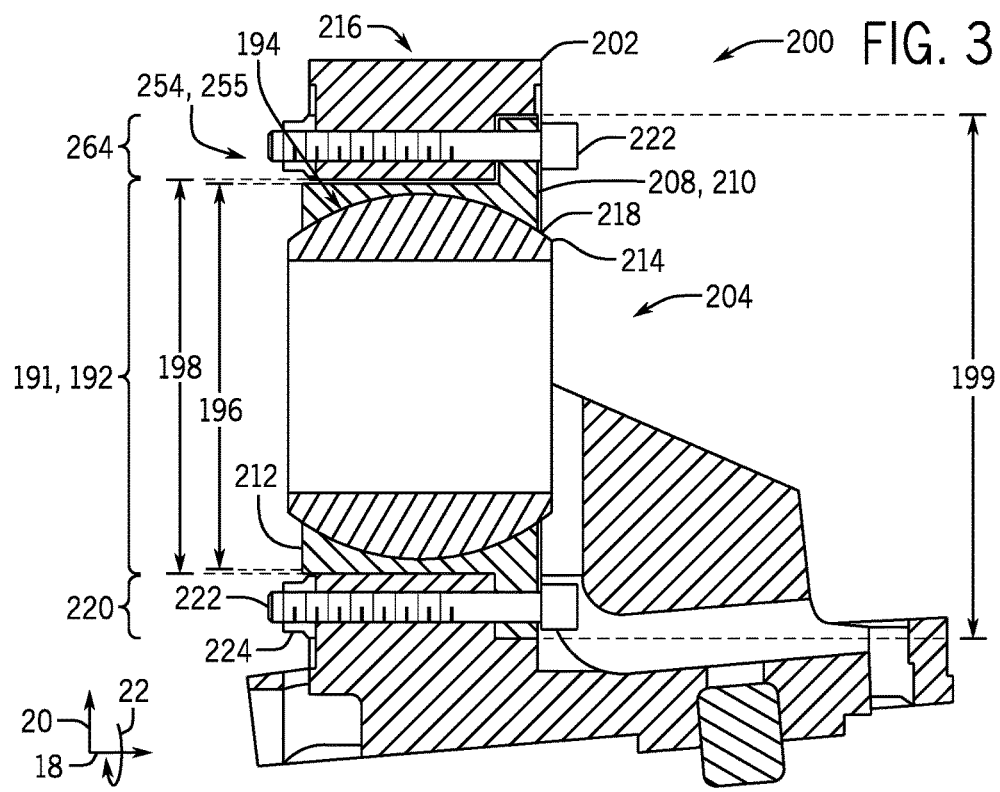
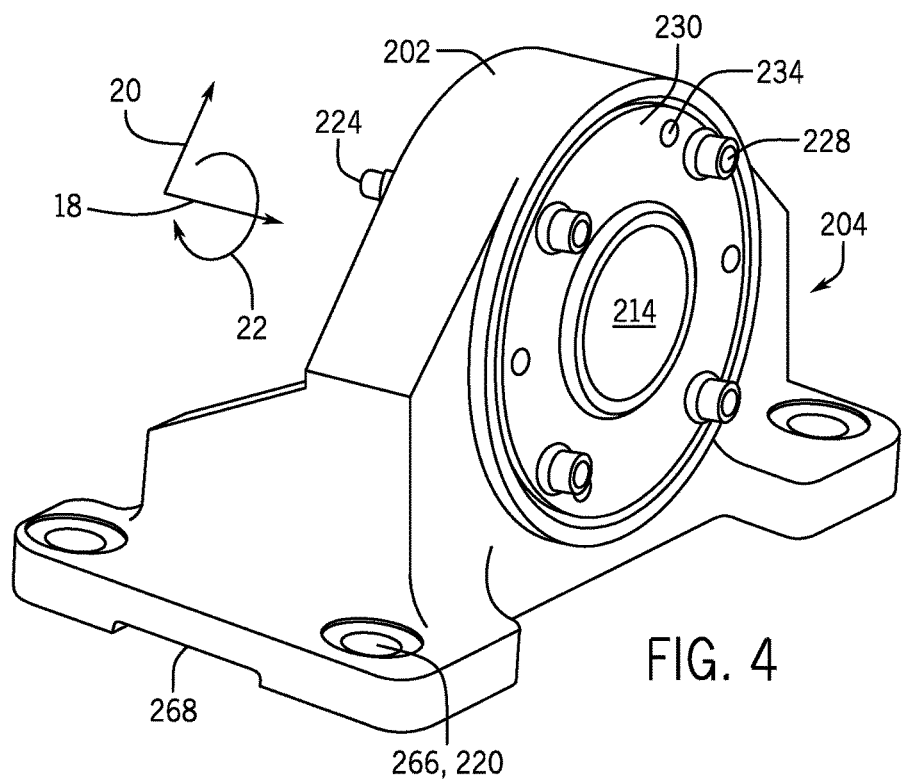

BEARING ASSEMBLY

BACKGROUND

The subject matter disclosed herein relates to gas turbine engines, and more specifically to, a bearing assembly.

Gas turbine engines generally include a compressor, a combustor, and a turbine. Some gas turbine engines include variable stator vanes (VSVs). For example, the compressor may include variable compressor stator vanes coupled to a torque shaft assembly associated with an actuator. The torque shaft assembly and associated actuator enable and coordinate movement of the variable compressor stator vanes.

The bearings may show accelerated wear after operation over time. The torque shaft assembly is coupled to the compressor via bearing assemblies. Removal and/or replacement of the worn bearings typically involves having to remove the entire torque shaft assembly.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a bearing assembly configured to be coupled to a compressor of a gas turbine engine and to receive an end of a torque shaft assembly, a bearing housing, and a circumferential bearing. The circumferential bearing includes a split race and a ball disposed within the split race. The circumferential bearing may be configured to be removed from the bearing housing without having to remove the torque shaft assembly from the compressor.

In a second embodiment, a circumferential bearing includes a split race including an annular portion that extends in an axial direction along a longitudinal axis of the split race, a flange portion that extends in a radial direction away from the longitudinal axis, and a plurality of thru holes configured to receive a respective bolt of multiple bolts. A ball may be disposed within the split race. The circumferential bearing may be configured to be removably coupled to a bearing housing coupled to a torque shaft assembly and also coupled to a compressor of a gas turbine engine via the multiple bolts.

In a third embodiment, a method includes removably attaching a circumferential bearing to a bearing housing disposed on a compressor of a gas turbine engine and coupled to a torque shaft assembly, including disposing a ball between at least two pieces of a split race to assemble the circumferential bearing, aligning multiple thru holes of a flange portion of the split race with multiple housing thru holes of the bearing housing, and securing the flange portion of the split race to the bearing housing via multiple bolts, each disposed respectively in an axial direction through multiple thru holes and multiple housing thru holes.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 3 is a cross-sectional view of a bearing assembly, including a bearing housing and a circumferential bearing;

FIG. 4 is a perspective view of a bearing assembly, with the circumferential bearing installed in the bearing housing;

DETAILED DESCRIPTION

Figure 1:
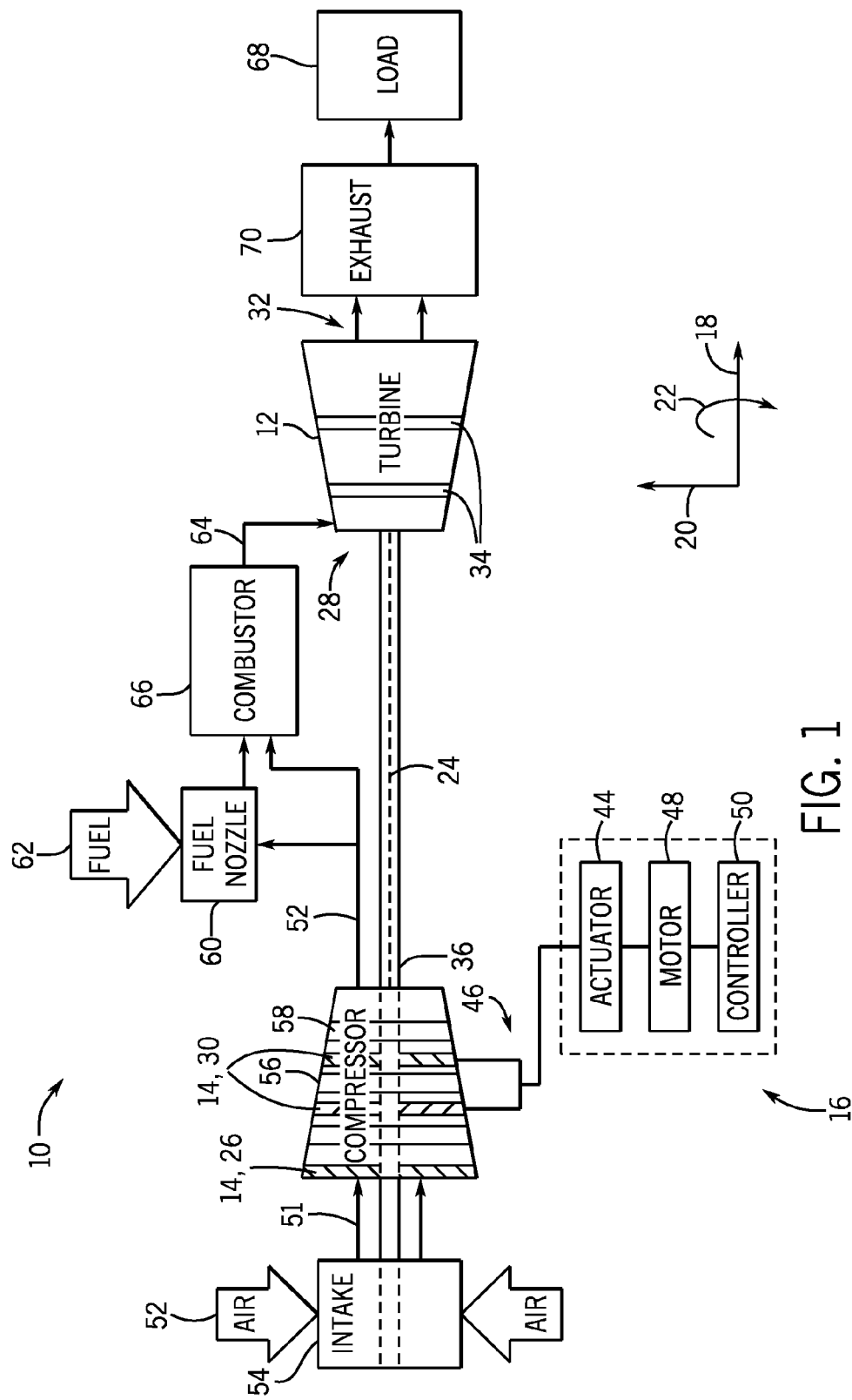
FIG. 1 is a schematic diagram of an embodiment of a gas turbine system having a compressor equipped with vanes and an actuation system with one or more electric actuators to control the vanes.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

A bearing assembly for a torque shaft assembly coupled to a compressor (e.g., variable compressor stator vanes) is described in detail below. The embodiments of the bearing assembly include a bearing housing and a circumferential bearing. The circumferential bearing includes a ball disposed between a split race. The split race may be split into two or more pieces. A flange portion of the split race includes a plurality of thru holes, and the bearing housing includes a plurality of housing thru holes. The housing thru holes may be disposed at various places on the bearing housing. The housing thru holes are aligned with a plurality of thru holes disposed in a flange portion of the circumferential bearing. The housing thru holes may be disposed equidistantly around a circumference of the bearing housing, or the housing thru holes may be concentrated in certain regions of the bearing housing. The pairs of housing thru holes and thru holes may be removably coupled together via a plurality of fasteners (e.g., bolts, nuts, screws). The flange portion also includes a plurality of tapped holes. The number of tapped holes disposed in the flange portion may be less than, greater than, or equal to the number of thru holes. The tapped holes may be disposed at various points on the flange portion to enable the user to disassemble the bearing assembly (i.e., remove the circumferential bearing from the bearing housing). In some embodiments, the tapped holes may be disposed equidistantly around the flange portion. Alternatively, the tapped holes may be concentrated in certain regions of the flange portion. The tapped holes may enable the user to utilize jack screws to disassemble the circumferential bearing from the bearing housing.

The orientation of the split race increases the contact area between the split race and the ball when compared to conventional slot loaded designs. The increased contact area between the split race and the ball reduces the overall wear of the assembly by reducing the contact stress on the surfaces. The split race may be split in both an axial direction along a longitudinal axis of the split race and in a radial direction away from the longitudinal axis. The flange portion of the split race enables the circumferential bearing to be installed, repaired, and/or replaced in the field through use of standard tooling (e.g., via wrenches instead of a press or arbor). The split race assembly enables the user to position the first half and the second half of the split race with the ball disposed within the race within the bearing housing. As described below, an outer portion of the split race may include a rabbet fit portion that enables the split race to be disposed correctly in the bearing housing. Ensuring proper positioning of the split race may prevent damage to the ball when coupled to the bearing housing. The rabbet fit portion of the split race enables recessed portions created by the rabbet fit to increase surface area between the circumferential bearing and the bearing housing. The rabbet fit portion disposed in the split race reduces the amount of vibration (e.g., vibratory loading) of the circumferential bearing and the fasteners relative to the bearing housing. The rabbet fit portion also reduces the amount of static and vibratory loading the circumferential bearing and the fasteners experience over time. Accordingly, the durability and life span of the circumferential bearing and the fasteners may be improved. Additionally, the rabbet fit outer portion of the split race enables the split race to be retained better in the bearing housing. The components of the bearing assembly enable the user to quickly access the bearing, such that the bearing can be replaced or repaired as needed without having to disassemble the torque shaft assembly from the compressor.

Turning now to the figures, FIG. 1 illustrates a block diagram of an embodiment of a gas turbine system 10 having a compressor 56 equipped with vanes 14 that may be adjusted by an actuation system 16. In some embodiments, the gas turbine system 10 may be a General Electric LM2500+ gas turbine engine. Throughout the discussion, a set of axes will be referenced. These axes are based on a cylindrical coordinate system and point in an axial direction 18, a radial direction 20, and a circumferential direction 22. For example, the axial direction 18 extends along a longitudinal axis 24 of the gas turbine system 10, the radial direction 20 extends away from the longitudinal axis 24, and the circumferential direction 22 extends around the longitudinal axis 24. Furthermore, it should be noted that a variety of rotary equipment, such as compressors, turbines, pumps, and/or the like, may benefit from the adjustable vanes 14 and the actuation system 16.

As shown, the compressor 56 includes multiple stages of the vanes 14 disposed at various positions along the compressor 56 in the axial direction 18. More specifically, the compressor 56 includes inlet guide vanes (IGVs) 26 (e.g., 14) positioned at an inlet 51 of the compressor 56, variable stator vanes (VSVs) 30 (e.g., 14) disposed between the inlet 51 and an outlet 52 of the compressor 56, and rotor blades 58 disposed between the IGVs 26 and the VSVs 30. In general, the rotor blades 58 are coupled to a rotor (e.g., shaft 36) of the compressor 56, and rotate about the longitudinal axis 24 in the circumferential direction 22 during operation of the compressor 56. On the other hand, IGVs 26 and VSVs 30 are coupled to stator (e.g., stationary) components of the compressor 56, and generally do not rotate about the longitudinal axis 24.

As illustrated, the actuator system 16 is coupled to each of the VSVs 30. The actuation system 16 includes an actuator 44 that controls each of the VSVs 30. For example, the actuator 44 may adjust a torque tube 46 (e.g., a structure that transmits radial forces along the axial direction 18) that, in turn, adjusts each of the VSVs 30. A motor 48 may drive the actuator 44, and controller 50 governs operation of the motor 48.

Operation of the gas turbine system 10 is summarized below. An oxidant 52 flows from an intake 54 into the compressor 56, where the rotation of the compressor blades 58 compresses and pressurizes the oxidant 52. The oxidant 52 may include ambient air, pure oxygen, oxygen-enriched air, oxygen-reduced air, oxygen-nitrogen mixtures, or any suitable oxidant that facilitates combustion of fuel. The following discussion refers to air 52 as an example of the oxidant, but is intended only as a non-limiting example. The air 52 flows into a fuel nozzle 60. Within the fuel nozzle 60, fuel 62 mixes with the air 52 at a ratio suitable for combustion, emissions, fuel consumption, power output, and the like. Thereafter, a mixture of the fuel 62 and the air 52 is combusted into hot combustion products 64 within a combustor 66. The hot combustion products 64 enter the turbine 12 and force rotor blades 34 to rotate, thereby driving the shaft 36 into rotation. The rotating shaft 36 provides the energy for the compressor 56 to compress the air 52. More specifically, the rotating shaft 36 rotates the compressor blades 58 attached to the shaft 36 within the compressor 56, thereby pressurizing the air 52 that is fed to the combustor 66. Furthermore, the rotating shaft 36 may drive a load 68, such as an electrical generator or any other device capable of utilizing the mechanical energy of the shaft 36. After the turbine 12 extracts useful work from the combustion products 64, the combustion products 64 are discharged to an exhaust 70.

Figure 2:
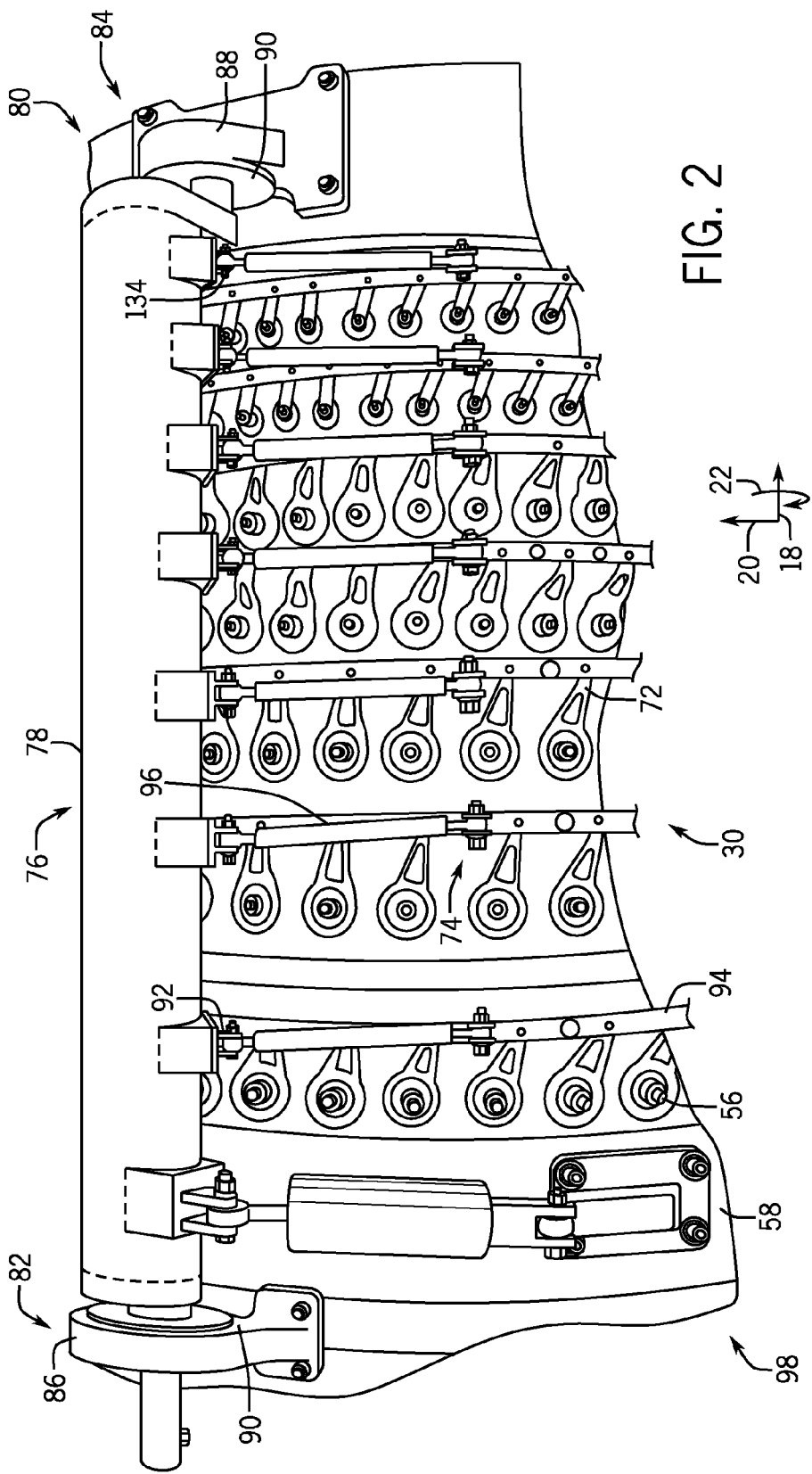
FIG. 2 is a perspective view of an embodiment of a compressor section of the gas turbine engine with a torque shaft type variable stator vane actuation assembly.

FIG. 2 is a perspective view of an embodiment of a compressor 56 section of the gas turbine engine 10 with a variable stator vane actuation assembly. The VSVs 30 may be rotatably mounted to a compressor casing 58 and may be actuated by vane crank arms 72 and unison ring assemblies 94 mounted exterior to the compressor casing for varying the angle of the VSVs 30. The controller 50 may provide mechanical or digital electronic control, and may be used to control operation of the engine 10 including the varying of the VSVs 30. A torque shaft assembly 76 is disposed on the compressor casing 58 of the compressor 56 of the engine 10. Though only one torque shaft assembly 76 is illustrated, two are typically used, one on each side of the engine or about 180 degrees apart from each other with respect to the longitudinal axis 24. The torque shaft assembly 76 may include a hollow tube 78 in the form of a metal tube with a substantially continuous tube wall to maintain structural integrity. In some embodiments, the tube may have a hollow interior 80. A forward or first end shaft 82 may be rotatably supported by a first shaft bearing 86. A rear or aft end 84 may be supported by a second shaft bearing 88. The first and second bearings 86 and 88 may include bases that are mounted substantially flush on the compressor casing 58, and bearing housings 90. Each clevis 92 is attached to a unison ring 94 and may be adjusted by a push rod 96. A hydraulic linear actuator 102 (e.g., actuator 44) is connected at a first end 98 compressor casing 58. As will be described in detail below, the first bearing 86 and/or the second bearing 88 may be part of a bearing assembly 200, disposed on the forward end 82 or the aft end 84 of the compressor 56 section of the engine 10. The components of the bearing assembly 200 enable the user to quickly access the components of the bearing, such that the bearing can be removed (e.g., for replacement of the pair) as needed without removal of the bearing housing and the torque shaft assembly from the compressor. Additionally, the disclosed embodiments of the bearing assembly reduce the wear on the bearing (e.g., circumferential bearing). The components of the bearing enable the user to couple (e.g., removably couple) the bearing to the bearing housing utilizing standard tooling.

FIG. 3 depicts a cross sectional view of the bearing assembly 200, including a bearing housing 202 and a bearing 204 (e.g., circumferential bearing). The circumferential bearing 204 includes a ball 214 disposed between a split race 208. The split race 208 may be split into two or more pieces. As depicted, the split race 208 may include a first half 210 and a second half 212. Though the split race 208 is shown split into two pieces, the split race 208 may be split into 3, 4, 5, 6, 7, 8, 9, 10, or more pieces. The split race 208 increases the contact area between the split race 208 and the ball 214 when compared to conventional slot loaded designs. The entire ball 214 (e.g., 100% of the ball 214) is in contact with the split race 208 as compared to conventional slot loaded designs where portions of the ball do not contact the race. The increased contact area between the split race 208 and the ball 214 reduces the overall wear of the assembly by reducing the contact stress on the surfaces (e.g., inner surface of split race and the outer surface of the ball). The split race 208 also improves radial loading capability of the bearing 204. The split race 208 may be split in both the axial direction 18 direction along the longitudinal axis 24 of the split race 208 and in the radial direction 20 away from the longitudinal axis 24. The split race 208 includes a first diameter 196 and a second diameter 198 (e.g., a double diameter 191). The first diameter 196 may be defined as the diameter of an inner annular portion of the flange portion 230, and the second diameter 198 may be defined as a second larger diameter of an outer annular portion. As such, the second diameter 198 is larger than the first diameter 196. In some embodiments, the ratio of the second diameter 198 to the first diameter 196 may be 10:1 to 1:1, 8:1 to 2:1, 6:1 to 3:1, and all ranges therebetween. The double diameter 191 may enable the alignment of the split race 208 to be achieved more easily. A third diameter 199 may be defined as an outermost diameter of the flange portion. The third diameter 199 is larger than the second diameter 198. The ratio of the third diameter 199 to the second diameter 198 may be 10:1 to 1:1, 8:1 to 2:1, 6:1 to 3:1, and all ranges therebetween. The split race 208 enables the bearing assembly 200 to be installed, and/or removed (e.g., for repair or replacement) in the field through use of standard tooling (e.g., wrenches).

The split race 208 assembly enables the user to position the first half 210 and the second half 212 of the split race 208 within the bearing housing 202 subsequent to disposing the ball 214 within the split race 208.

As described below, an outer portion of the split race 208 may form rabbet fit portion 254 that enables the split race 208 to be disposed correctly in the bearing housing 202. Ensuring proper positioning of the split race 208 may prevent damage to the ball 214 disposed between the split race 208 when inserted into the bearing housing 202. A rabbet fit portion 254 of the split race 208 enables recessed portions created by the rabbet fit to increase surface area between the circumferential bearing 204 and the bearing housing 202. As such, the rabbet fit portion 254 disposed in the split race 208 reduces the amount of vibration of the circumferential bearing 204 relative to the housing 202 when disposed in the bearing housing 202. The bearing housing 202 may include an opening or cavity to receive the annular portion 192 of the split race 208. The bearing housing 202 may also include a rabbet fit portion 255 to form a rabbet fit joint 264 with the split race 208. Accordingly, the durability and life span of the circumferential bearing 204 and the fasteners 220 may be improved and the bearing may be retained better in the bearing housing 202. The split race 208 may also enable the use of a hard coating (e.g., tungsten carbide) to be disposed on the outer surface 218 of the ball and the inner surface of the split race 216 to reduce the wear between the ball 214 and the split race 208.

As described below, the split race 208 includes a plurality of thru holes 228 disposed on the flange portion 230 of the split race 208. The thru holes 228 may be configured to receive a plurality of fasteners 220 (e.g., bolts 222, nuts 224) to couple the circumferential bearing 204 to the bearing housing 202. The flange portion 230 may extend in the radial direction 20 away from the longitudinal axis 24. The split race 208 includes an inner surface 216 that contacts an outer surface 218 of the ball 214 when the ball 214 is disposed in the split race 208. In some embodiments, the entire inner surface 216 of the split race 208 may be in contact (e.g., interface) with the outer surface 218 of the ball. The ball 214 may be installed between the pieces (e.g., first half 212, second half 214) of the split race 208 prior to installing the circumferential bearing 204 on the bearing housing 202.

FIG. 4 depicts a perspective view of the bearing assembly 200, with the circumferential bearing 204 installed in the bearing housing 202. The flange portion 230 of the split race 208 includes the plurality of thru holes 228, and the bearing housing 202 includes a plurality of housing thru holes 206. The housing thru holes 206 may be disposed at various places on the bearing housing 202. The housing thru holes 206 may increase the axial 18 retention of the circumferential bearing 204 to the bearing housing 202 by enabling the circumferential bearing 204 to be secured via a plurality of fasteners 220. The housing thru holes 206 are aligned with a plurality of thru holes 228 disposed in a flange portion 230 of the circumferential bearing 204. In some embodiments, there may be 1, 2, 3, 4, 5, 6, 7, 8, 9, 10, or more pairs 232 of housing thru hole 206 and thru hole 228 pairs. The housing thru holes 206 may be disposed in the bearing housing 202. The housing thru holes 206 may be disposed equidistantly around the circumference of the bearing housing 202, or the housing thru holes 206 may be concentrated in certain regions of the bearing housing 202. The pairs 232 may be removably coupled together via the plurality of fasteners 220 (e.g., bolts 222, nuts, screws). A plurality of base thru holes 266 may also be disposed on a portion of the base 268. The base thru holes 266 may be disposed around the perimeter of the base 268. The base thru holes 266 enable fasteners 220 to couple the base 268 of the bearing housing 202 to the compressor 56. The fasteners 220 may be radially 20 coupled to the compressor 56.

The flange portion 230 also includes a plurality of tapped holes 234. The number of tapped holes 234 disposed in the flange portion 230 may be less than, greater than, or equal to the number of thru holes 228. There may be 1, 2, 3, 4, 5, 6, 7, 8, 9, 10, or more tapped holes 234 disposed circumferentially 22 around the flange portion 230 of the split race 208. The tapped holes 234 may be disposed at various points on the flange portion 230 to enable the user to remove the bearing from the housing. In some embodiments, the tapped holes 234 may be disposed equidistantly around the flange portion 230. Alternatively, the tapped holes 234 may be concentrated in certain regions of the flange portion 234. The tapped holes 234 may enable the user to access part (e.g., first half 210, second half 212) of the split race 208 or the ball 214 for removal from the bearing housing 202 by removing a plurality of jack screws.

Figure 5:
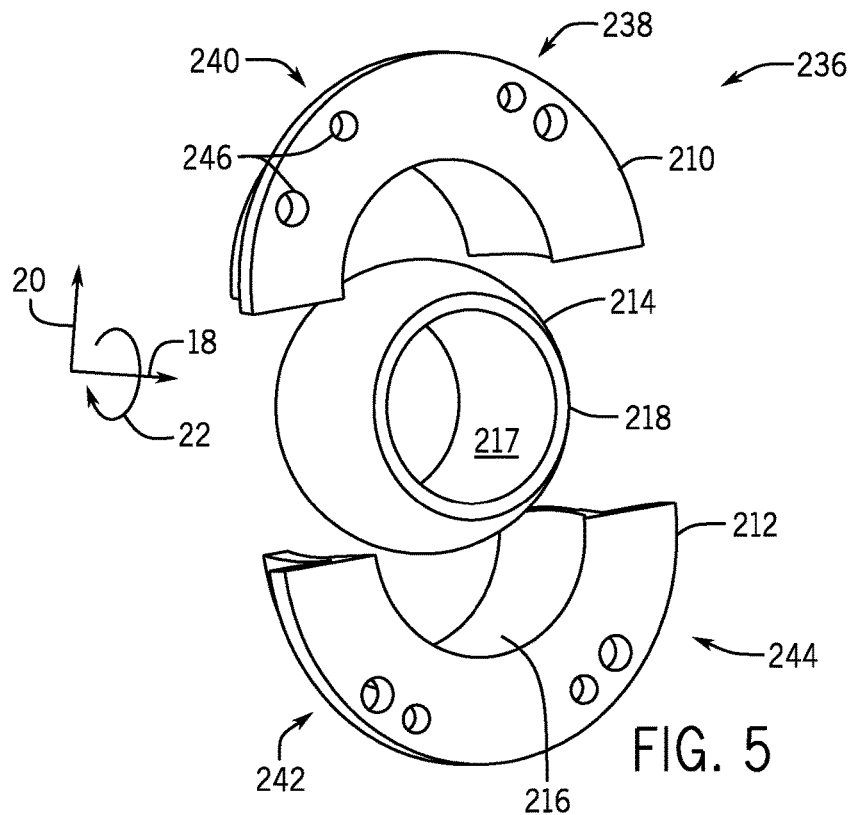
FIG. 5 is an exploded view of the split race and the ball of the circumferential bearing.

FIG. 5 depicts an exploded view of the split race 208 and the ball 214. Both the first half 210 and the second half 212 of the split race 208 include an inner surface 216. The inner surface 216 of the split race 208 may be coated with tungsten carbide or other similar materials to increase resistance to wear. The split race 208 may be made of materials such as stainless steel (e.g., 17-4 PH™). The ball 214 may be disposed within the split race 208. The outer surface 218 of the ball 214 may also be coated with tungsten carbide or other similar materials. An inner surface 217 of the ball 214 may be a different material than the coating of the outer surface 218. For example, the inner surface 217 of the ball 214 may be a cobalt-based alloy, such as Stellite™ 6. Within the split race 208, the plurality of thru holes 228 may be disposed around the flange portion 230 of the split race 208 to enable the split race 208 to be removably coupled to the bearing housing 202. In one example, the thru holes 228 may be equally divided among four quadrants 236 (e.g., first quadrant 238, second quadrant 240, third quadrant 242, fourth quadrant 244). The split configuration of the race 208 increases the contact area between the split race 208 and the ball 214 when compared to conventional slot loaded designs. The increased contact area between the split race 208 and the ball 214 reduces the overall wear of the assembly by reducing the contact stress on the surfaces. The split configuration of the race 208 enables the ball 214 to rotate within the split race 208 with three degrees of freedom (e.g., axially 18, radially 20, circumferentially 22). The ball 214 may include an opening to receive the aft end 84 of the torque shaft assembly 76. In some embodiments, the diameter 246 of the thru holes 228 may vary. The thru holes 228 may be disposed equidistantly within each quadrant 236 (e.g., first quadrant 238, third quadrant 242), or the thru holes 228 may be spaced further apart (e.g., second quadrant 240).

Figure 6:
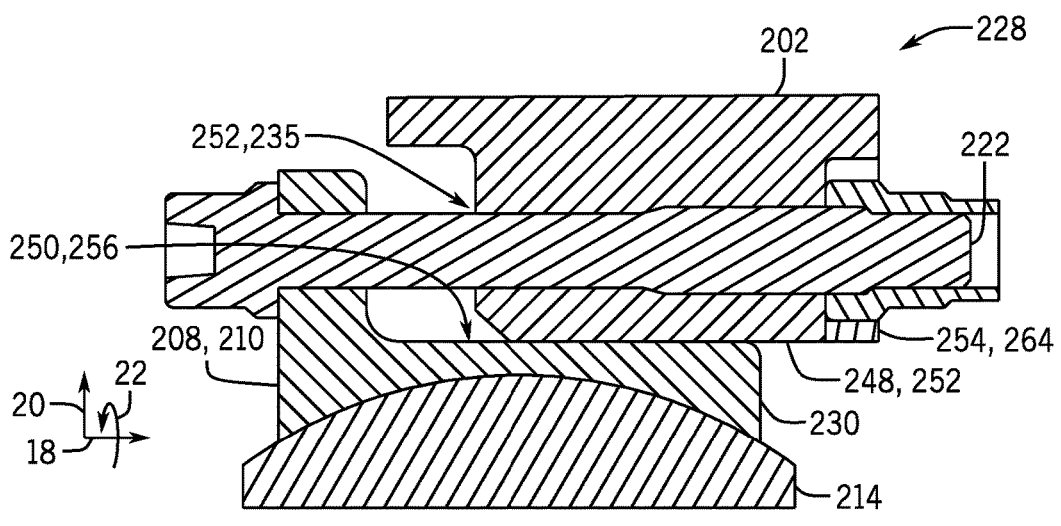
FIG. 6 is a cross-sectional view of a portion of a bearing assembly during assembly.
Figure 7:
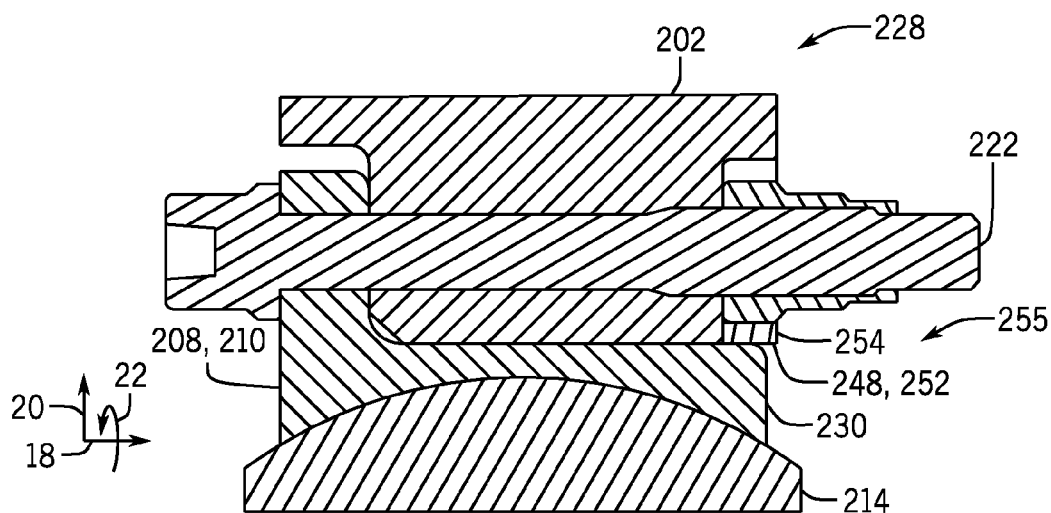
FIG. 7 is a cross-sectional view of a portion of a bearing assembly after assembly.

FIG. 6 depicts a cross-sectional view of the bearing assembly 200 during assembly. The bearing housing 202 may include an inner surface 248 which interfaces with an external side 250 of the flange portion 230. The inner surface 248 may include a plurality of dimples 252. The dimples 252 may be disposed on a radial surface 235 of the bearing housing 202 to reduce damage to the radial surface 235 where the flange 230 contacts the radial surface 235. The dimples 252 may also reduce the occurrence of high metal that may prevent uniform placement (e.g., uniform contact) of the flange portion 230 within the bearing housing 202. The bearing housing 202 may interface with the rabbet fit 254 outer portion 256 of the split race 208. The rabbet fit portion 254 of the split race 208 ensures the split race 208 (e.g., first half 210) is disposed correctly in the housing 202. Proper positioning of the split race 208 may avoid damage to the ball 214 when the bearing 206 is disposed on the housing 202. The recessed portions created by the rabbet fit portion 254 increase the surface area between the split race and the bearing housing 202. As such, the rabbet fit portion 254 reduces the amount of vibration of the circumferential bearing 204 when disposed in the bearing housing 202. Accordingly, the durability and life span of the circumferential bearing 204 and the fasteners 220 may be improved. Additionally, the rabbet fit portion 254 of the split race 208 enables the split race 208 to be retained better in the bearing housing 202. The bearing housing 202 may include an opening or cavity to receive the annular portion 192 of the split race 208. The bearing housing 202 may also include a rabbet fit portion 255 to form a rabbet fit joint 264 with the split race 208. In some embodiments, the pieces of the split race 208 may be free fit (e.g., by hand). The user can visually detect the proper positioning of the split race 208 by utilizing the rabbet fit joint 264 of the outer portion 255 in the housing 202. The user may free fit a first portion of the annular portion 192 disposed adjacent a first end of the annular portion 192, and the user may rabbet fit a portion of the annular portion 192 disposed adjacent a second end of the annular portion 192. In other words, the annular portion 192 may include more than one kind of mechanical fit portions 254. The fasteners 220 (e.g., bolts 222) may be disposed within the flange portion 230 such that 5, 6, 7, 8, 9, 10, or more threads of the bolt 222 are utilized when the split race 208 is coupled to the housing 202. FIG. 7 depicts a cross-sectional view of the bearing assembly 200 after assembly. The axial retention of the bearing assembly 200 is improved by utilizing a plurality of fasteners 220 (e.g., bolt 222) through the flange portion 230 by reducing the variability associated with typical assembly of other bearing assemblies (e.g., swaging). In some embodiments, the pieces of the split race 208 may be free fit (e.g., by hand) to enable faster assembly of the bearing assembly 200 and centering of the pieces of the split race 208 (e.g., first half 210, second half 212).

Figure 8:
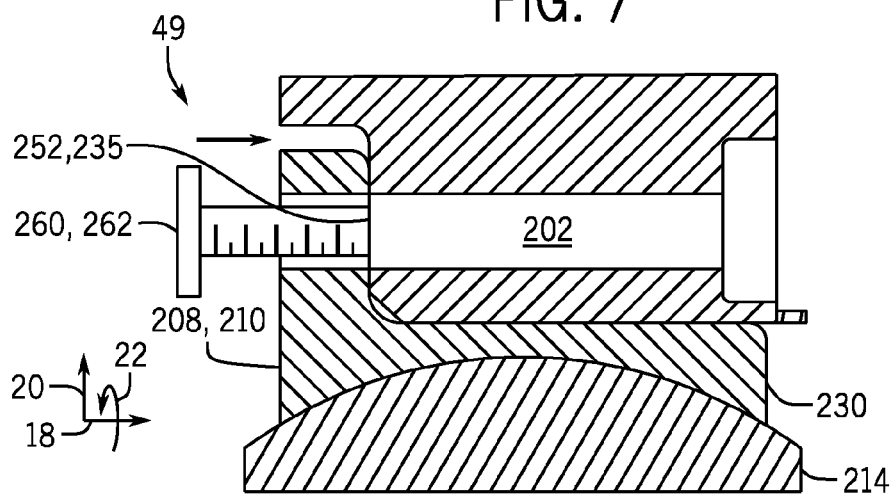
FIG. 8 is a cross-sectional view of a portion of a bearing assembly during a first part of disassembly.

FIG. 8 depicts a cross-sectional view of the bearing assembly 200 during a first part of disassembly. A portion of the threaded fasteners 260 (e.g., jack screws 262) may be disposed (e.g., threaded) in the tapped holes 234 in the flange portion 230. Coupling the threaded fasteners 260 (e.g., jack screws 262) part way through the flange portion 230 through the tapped holes 234 may enable faster disassembly (e.g., uncoupling) the bearing assembly 200 from the compressor 56. As such, the ball 214 may be removed more easily from within the first half 208 and the second half 210 of the split race 208. The jack screws 262 may be threaded through the entire distance of the tapped hole 234, or the jack screws may be partially threaded through the distance of the tapped hole 234. The jack screws 262 may be threaded in the axial direction, as indicated by arrow 49, during the first part of disassembly. The dimples 252 may be disposed on a radial surface 235 of the bearing housing 202 to reduce wear to the radial surface 235 where the flange 230 contacts the radial surface 235. The dimples 252 may also reduce the occurrence of high metal that may prevent uniform placement (e.g., uniform contact) of the flange portion 230 within the bearing housing 202.

Figure 9:
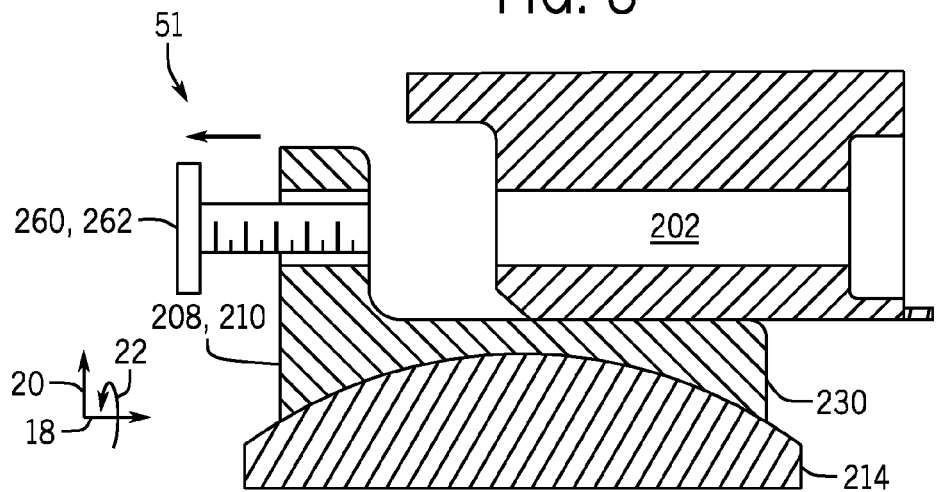
FIG. 9 is a cross-sectional view of a portion of a bearing assembly during a second part of disassembly.

FIG. 9 depicts a cross-sectional view of the bearing assembly 200 during a second part of disassembly. The threaded fasteners 260 (e.g., jack screws 262) may be tightened and the flange portion 230 of the first half 208 and the second half 210 may be removed. The distance 264 the jack screws 262 may extend through the flange portion 230 may include 1, 2, 3, 4, 5, 6, 7, 8, or more threads of the jack screw 262. Utilizing the jack screws 262 may enable the bearing assembly 200 to be removed and/or repaired without having to remove the entire torque shaft assembly 76 from the compressor 56. The jack screws 262 may be pulled out in the axial direction, as indicated by arrow 51, during the second part of disassembly.

Figure 10:
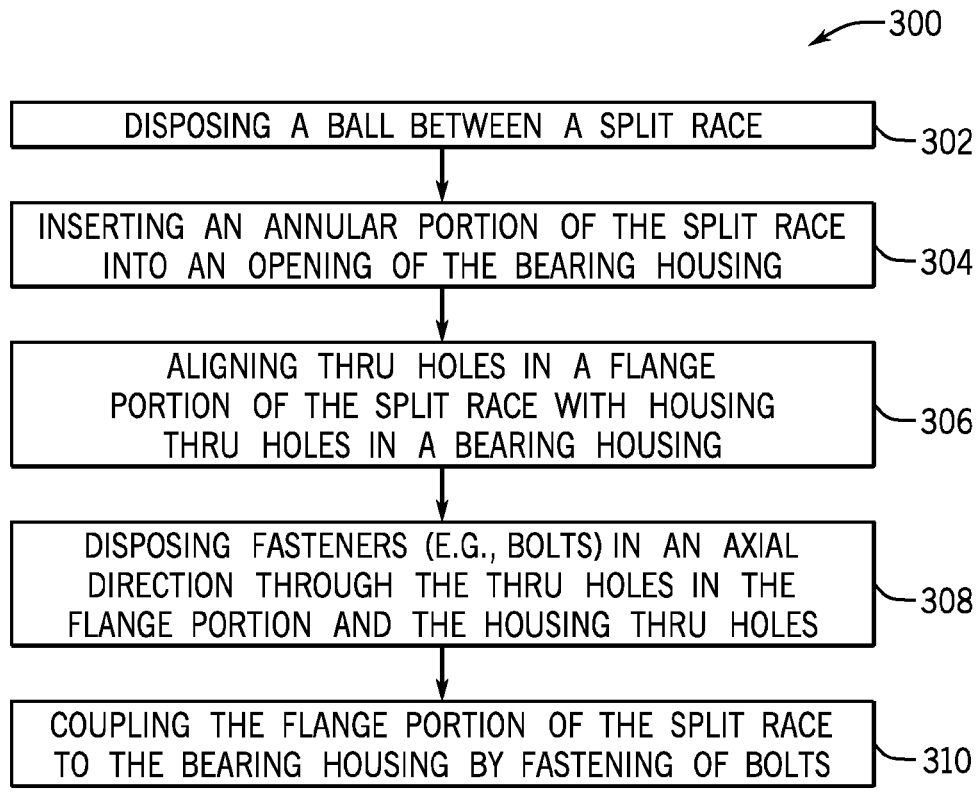
FIG. 10 is a flow chart illustrating an embodiment of a method for assembling the circumferential bearing to the bearing housing.

FIG. 10 is a flow chart illustrating an embodiment of a method for assembling the circumferential bearing 204 to the bearing housing 202. The method 300 may include disposing the ball 214 between a split race (block 302) before the split race 208 is free fit by hand. The method 300 may include inserting the annular portion 192 of the split race (block 304) into the opening or cavity of the bearing housing 202. As described above, the split race 208 may include rabbet fit portions 254 such that the split race 208 may be disposed in a manner which may avoid damage to the ball 214. The method 300 may include aligning the plurality of thru holes 228 disposed in the flange portion 230 of the split race 208 with the plurality of thru holes 204 disposed in the bearing housing 202 (block 306). Aligning the plurality of thru holes 228 disposed in the flange portion 230 of the split race 208 with the plurality of thru holes 204 of the bearing housing 202 may enable the user to dispose the plurality of fasteners 220 (e.g., bolts 222) within the thru holes 228 in the flange portion 230 and the housing thru holes 204 of the bearing housing 202 (block 308). The plurality of thru holes 228 disposed in the flange portion 230 of the split race 208 and the plurality of thru holes 204 are aligned in the axial direction 18. The method 300 may include coupling (e.g., securing via axial retention) the flange portion 230 of the split race 208 to the bearing housing 202 by fastening (e.g., removably coupling) the fasteners and/or bolts (block 310).

Figure 11:
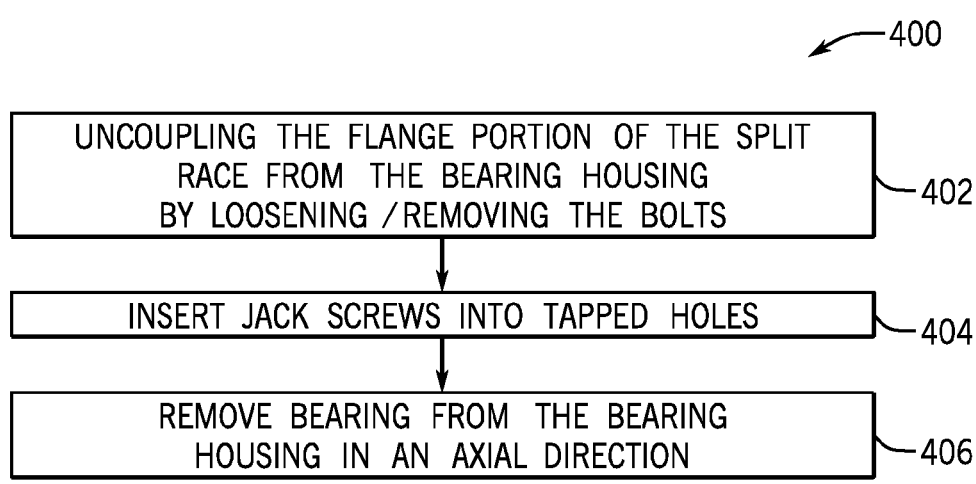
FIG. 11 is a flow chart illustrating an embodiment of a method for disassembling the circumferential bearing from the bearing housing.

FIG. 11 is a flow chart illustrating an embodiment of a method 400 for disassembling the circumferential bearing 204 from the bearing housing 202. The method 400 may include uncoupling the flange portion 230 of the split race 208 from the bearing housing 202 by loosening/removing the bolts 222 (block 402). The method 400 may include inserting (e.g., threading) the jack screws 262 into the tapped holes 234 (block 404). The method 400 may include removing the bearing 206 from the bearing housing 202 in an axial direction (block 406) while the bearing assembly 200 is disposed on the compressor section 56 by pulling on the ends of the jack screws 262. The dimples 252 disposed on the radial surface 235 of the bearing housing 202 may reduce the occurrence of high metal that may prevent uniform placement (e.g., uniform contact) of the flange portion 230 within the bearing housing 202.

Technical effects of the disclosed embodiments include a system and method relating to a bearing assembly 200 including a bearing housing 202 and a circumferential bearing 204. A ball 214 is disposed between a split race 208. The split race 208 may be split into two or more pieces. A flange portion 230 of the split race 208 includes the plurality of thru holes 228, and the bearing housing 202 includes a plurality of housing thru holes 204. The housing thru holes 204 are aligned with a plurality of thru holes 228 disposed in a flange portion 230 of the circumferential bearing 204. The housing thru holes 206 and the thru holes 228 may be coupled together via a plurality of fasteners 220. Jack screws 262 may be disposed in a plurality of tapped holes 234 disposed on the flange portion 230 so that the bearing assembly 200 may be removed and/or repaired while disposed on the compressor section 56.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a bearing assembly configured to be coupled to a compressor of a gas turbine engine and to receive an end of a torque shaft assembly, comprising:
a bearing housing; and
a circumferential bearing comprising:
a split race, wherein the split race comprises an annular portion that extends in an axial direction along an longitudinal axis of the split race and a flange portion that extends in a radial direction away from the longitudinal axis, and wherein the split race is split both in the axial direction along the longitudinal axis and in the radial direction away from the longitudinal axis; and
a ball disposed within the split race;
wherein the split race of the circumferential bearing is configured to be removed from the bearing housing without having to remove the torque shaft assembly from the compressor.

2. The system of claim 1, wherein the split race comprises at least two pieces.

3. The system of claim 1, wherein the ball is configured to be installed between the at least two pieces of the split race prior to installation of the circumferential bearing on the bearing housing.

4. The system of claim 1, wherein the annular portion of the split race comprises an inner surface that interfaces with an outer surface of the ball, and an entirety of the inner surface interfaces with the outer surface of the ball.

5. The system of claim 4, wherein both the inner surface of the annular portion and the outer surface of the ball are coated with tungsten carbide.

6. The system of claim 1, wherein the flange portion comprises a plurality of thru holes, the bearing housing comprises a plurality of housing thru holes that align with the plurality of thru holes, and the bearing assembly comprises a plurality of bolts, wherein each bolt of the plurality of bolts extends thru a respective thru hole of the plurality of thru holes and a respective housing thru hole of the plurality of housing thru holes to couple the circumferential bearing to the bearing housing.

7. The system of claim 6, wherein the plurality of bolts extend thru the flange portion and the bearing housing in the axial direction parallel to the longitudinal axis.

8. The system of claim 6, wherein the flange portion and the bearing housing form a rabbet fit coupling when coupled together.

9. The system of claim 6, wherein the flange portion comprises a plurality of tapped holes, wherein the tapped holes are configured to be utilized as jack screw holes in disassembly of the circumferential bearing from the bearing housing.

10. The system of claim 6, wherein the bearing housing comprises a surface that interfaces with the flange portion of the split race, and the surface comprises a plurality of dimples.

11. The system of claim 1, comprising the gas turbine engine having the compressor, the torque shaft assembly, and the bearing assembly.

12. A circumferential bearing, comprising:
   a split race comprising an annular portion that extends in an axial direction along a longitudinal axis of the split race, a flange portion that extends in a radial direction away from the longitudinal axis, and a plurality of thru holes on the flange portion and each thru hole is configured to receive a respective bolt of a plurality of bolts, wherein the split race is split both in the axial direction along the longitudinal axis and in the radial direction away from the longitudinal axis, and the split race comprises at least two pieces; and
   a ball disposed within the split race;
   wherein the split race of the circumferential bearing is configured to be removably coupled, via the plurality of bolts, to a bearing housing of a torque shaft assembly coupled to a compressor of a gas turbine engine.

13. The circumferential bearing of claim 12, wherein the ball is configured to be installed between the at least two pieces of the split race prior to removably coupling the circumferential bearing to the bearing housing.

14. The circumferential bearing of claim 12, wherein the annular portion of the split race comprise an inner surface that interfaces with an outer surface of the ball, and an entirety of the inner surface interfaces with the outer surface of the ball.

15. The circumferential bearing of claim 14, wherein both the inner surface of the annular portion and the outer surface of the ball are coated with tungsten carbide.

16. A method of removably attaching a circumferential bearing to a bearing housing disposed on a compressor of a gas turbine engine and coupled to a torque shaft assembly, comprising:
   disposing a ball between at least two pieces of a split race to assemble the circumferential bearing;
   aligning a plurality of thru holes of a flange portion of the split race with a plurality of housing thru holes of the bearing housing; and
   securing the flange portion of the split race to the bearing housing via a plurality of bolts each disposed respectively in an axial direction through the plurality of thru holes and the plurality of housing thru holes.

17. The method of claim 16, comprising:
unfastening the plurality of bolts; and
detaching the circumferential bearing from the bearing housing without removing the torque shaft assembly from the compressor.

* * * * *